United States Patent
Miyabayashi et al.

(10) Patent No.: US 9,485,675 B2
(45) Date of Patent: Nov. 1, 2016

(54) METHOD OF OPERATING WIRELESS COMMUNICATIONS NETWORK AND BASE STATION FOR USE IN WIRELESS COMMUNICATION NETWORK

(75) Inventors: Akiyoshi Miyabayashi, Dublin (IE); Colm Russell, Dublin (IE); Richard Walsh, Cork (IE); Anthony Lee, Meath (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1077 days.

(21) Appl. No.: 12/919,538

(22) PCT Filed: Feb. 29, 2008
(Under 37 CFR 1.47)

(86) PCT No.: PCT/EP2008/052466
§ 371 (c)(1),
(2), (4) Date: Oct. 17, 2011

(87) PCT Pub. No.: WO2009/106138
PCT Pub. Date: Sep. 3, 2009

(65) Prior Publication Data
US 2012/0058796 A1  Mar. 8, 2012

(51) Int. Cl.
*H04W 24/04* (2009.01)
*H04W 52/00* (2009.01)
*H04W 16/00* (2009.01)
*H04W 48/02* (2009.01)

(52) U.S. Cl.
CPC .............. *H04W 24/04* (2013.01); *H04W 16/00* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 5,584,049 A * | 12/1996 | Weaver et al. | ............ 455/67.11 |
| 6,222,821 B1 | 4/2001 | Sees et al. | |
| 6,628,933 B1 | 9/2003 | Humes | |
| 2002/0131378 A1 | 9/2002 | Korinek et al. | |
| 2007/0190996 A1 | 8/2007 | Asthana et al. | |
| 2007/0225028 A1 | 9/2007 | Nelson et al. | |

FOREIGN PATENT DOCUMENTS

CN 1949908 A 4/2007

OTHER PUBLICATIONS

Kumar et al, "Availability Modelling of the 3GPP R99 Telecommunication Networks", Proc European Safety and Reliability Conference, 2003.
International Search Report for PCT/EP2008/052466, mailed Dec. 1, 2008.
State Intellectual Property Office of People's Republic China Search Report for Application No. 200880128979.3; Filing Date: Feb. 29, 2008.
EPO Communication pursuant to Article 94(3) EPC for Application No. 08 717 247.4-1857, May 13, 2015.

* cited by examiner

*Primary Examiner* — Philip Sobutka
(74) *Attorney, Agent, or Firm* — Baker Botts, LLP

(57) ABSTRACT

A method of operating a wireless communications network comprising a first plurality of base stations serving a second plurality of subscriber stations and at least one Radio Network Controller. The method comprises detecting (102) a malfunction affecting provision of services by a base station, determining (104) cell affected by said malfunction. If said base station continues (106) to transmit signal in said affected cell then power of signal transmitted by said base station in the affected cell is reduced (108) and adjusting (110) power of signal transmitted by base stations in cells adjacent to said affected cell to provide network coverage for the affected area.

20 Claims, 5 Drawing Sheets

METHOD OF OPERATING WIRELESS COMMUNICATIONS NETWORK AND BASE STATION FOR USE IN WIRELESS COMMUNICATION NETWORK

This application is the U.S. national phase of International Application No. PCT/EP2008/052466 filed 29 Feb. 2008, the entire contents of which is hereby incorporated by reference.

TECHNICAL FIELD

The present invention relates to management of wireless communications networks, in general, and in particular to providing network coverage in case of failure of a base station or failure of a transmission link between the base station and the network.

BACKGROUND

In a wireless communications network when a base station faces some problems, e.g. power module failure, transmission failure, hanging radio-links etc, status information can be found on the network monitoring display. Then, alarms are raised to indicate the problem. In solutions known in the art the base station continues to emit a signal with the same power, encouraging existing traffic within its domain to continue to attempt access in each of its cells. Usually, an operator checks the monitoring continuously and resolution work is executed by sending technicians to the base station site. Moreover, until the problem is repaired, the radio coverage of a particular area is not optimal.

There are several scenarios in which such failures manifest resulting in network disturbances such as reduced accessibility and increased drop rates. For example it happens sometimes that during network upgrade base stations lose connectivity with the RNC and each such instance requires a site visit. This requires an on-site team to be on standby for each predicted failure, incurring a manpower limitation on the total number of upgrades that can be attempted during a maintenance window.

A network operator requests correction work to be carried out by field engineers when a network failure is indicated by the network management system. The drawback of the existing solutions is that they require immediate site visit, which are expensive and increase OPEX (Operational expenditure). Also, since the identification of the problem is human dependent, this incurs a period of diagnosis and a delay during which the on-site team is being deployed. There is no recommended sequence of activities that should be executed either manually or automatically to minimize the network disturbance.

SUMMARY

It is the object of the present invention to obviate at least some of the above disadvantages and provide an improved method of operating a wireless communications network in case of a base station not being able to provide communication services in part or in all of its cells.

Accordingly, the invention seeks to preferably mitigate, alleviate or eliminate one or more of the disadvantages mentioned above singly or in any combination.

According to a first aspect of the present invention there is provided a method of operating a wireless communications network comprising a first plurality of base stations serving a second plurality of subscriber stations and at least one Radio Network Controller controlling said plurality of base stations. The method comprises detecting a malfunction affecting provision of services by a base station and determining cell(s) affected by said malfunction. If said base station continues to transmit signal in said affected cell then power of signal transmitted by said base station in the affected cell is reduced and power of signal transmitted by base station in cells adjacent to said affected cell is adjusted to provide network coverage for the affected cell.

According to a second aspect of the present invention there is provided a wireless communications network comprising a first plurality of base stations serving a second plurality of subscriber stations and at least one Radio Network Controller controlling said plurality of base stations. A base station is adapted to detect a malfunction affecting provision of services by the base station and to determine cell affected by said malfunction. The base station is adapted to reduce power of signal transmitted in the affected cell if said base station continues to transmit signal in said affected cell. The Radio Network Controller is adapted to adjust power of signal transmitted by base stations in cells adjacent to said affected cell in order to provide network coverage for the affected cell.

According to a third aspect of the present invention there is provided a base station for use in a wireless communications network adapted to detect a malfunction affecting provision of services by said base station and to determine a cell affected by said malfunction. If the base station continues to transmit signal in the affected cell it is also adapted to reduce power of signal transmitted in the cell affected by the malfunction.

According to a fourth aspect of the present invention there is provided a network management system for a wireless communications network adapted to operate in accordance with the method defined above.

Further features of the present invention are as claimed in the dependent claims.

The present invention provides the benefit of decreasing radio coverage holes caused by failures in equipment, software or physical links. This, in turn, results in improved accessibility and retainability Key Performance Indicators (KPIs). The present invention allows for simplified and cheaper management of service engineers operating in the field because the telecommunications services can be provided even in areas affected by the failure. For the same reason it also allows for greater batch sizes of network upgrades.

BRIEF DESCRIPTION OF THE DRAWINGS

The present invention will be understood and appreciated more fully from the following detailed description taken in conjunction with the drawings in which.

DETAILED DESCRIPTION

The present invention uses an automated function distributed across radio base stations (RBSs), Radio Network Controller (RNC) and OSS that will execute remedial steps which are required to minimize network disturbance caused by a failure resulting in RBS not being capable of providing telecommunications or data services during the period starting from diagnosis to the point when an on-site team can intervene.

Figure 1:
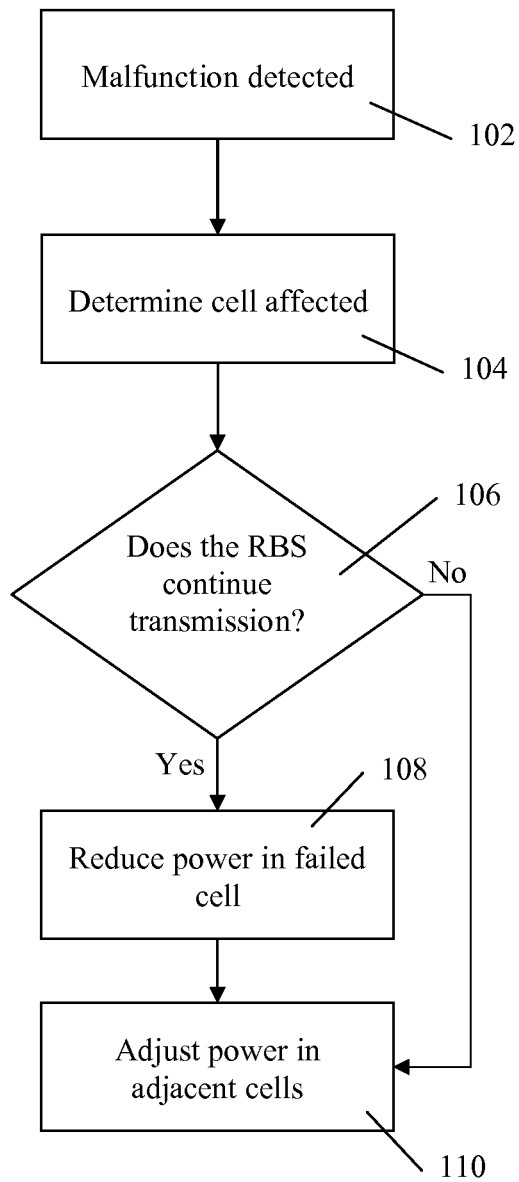
FIG. 1 is a flowchart illustrating a method of operating a wireless communications network in one embodiment of the present invention.

Embodiments of a method of operating a wireless communications network will be discussed with reference to FIG. 1 and FIGS. 4A and 4B. The wireless communications network comprises a first plurality of base stations 502-510 serving a second plurality of subscriber stations 528-532. The subscriber stations could be mobile phones, but could equally be static user equipment, for example used for data services (e.g. access to internet from a desktop computer, vending machine with communication module, etc.). The network also comprises at least one Radio Network Controller 512 to control said first plurality of base stations and a network management function 514. The network management function 514 is centralised and also known as OSS (Operation and Support Subsystem). In a preferred embodiment network management functions are also distributed across the network and localised in the network elements.

When abnormality is noticed, the network management function distributed across various network elements takes the following steps.

In the first step the base station 508 self-diagnoses 102 its operational condition and connectivity with RNC 512 by checking status information, i.e. by picking up the internal alarms that are raised.

Once the failure is detected the base station determines 104 the cell (or cells) which are affected by the malfunction. Depending on type and extent of the failure said failure may cover one cell served by the base station 508 or more than one cell of the base station. In some situations the failure affects all cells served by the RBS. If the base station continues to transmit signal in the affected cell (or cells) 106 the base station reduces power of the transmitted signal 108. Without this power reduction all the subscriber stations 530 camped in the affected cell would try to connect to this base station 508. Because the base station cannot provide services the power of signal is reduced and this operation encourages (or forces) existing traffic to handover or to begin call setup to cell (or cells) in the UTRAN (UMTS Terrestrial Radio Access Network) or overlapping GSM network. Depending on the extent of the malfunction the base station initiates problematic cell inactivation (if part of the cells failed) or inactivation of all cells (when services cannot be provided in any of the cells served by said base station). This obviously has the effect of reducing the power transmitted in these cells to zero and forcing the subscriber stations to handover to other base stations (or cells). In order to provide network coverage in the area where services were provided by the failed base station 508 (all cells or only part of them) power of signals transmitted by base stations 502-506 and 510 in cells adjacent 516-520 and 524 to said affected area is adjusted 110 (increased or, in some cases, reduced). The power increase is requested by the Radio Network Controller 512 or the network management function 514 orders RNC 512 to request such increase.

In one embodiment the appropriate RF power levels that are applied to the adjacent cells are stored per cell (in a planned configuration in the network management function 514) or in an alternative embodiment calculated based on the known operational power levels of the affected cells. Current load/traffic volume on the adjacent cells is considered when calculating the power and traffic types to be admitted to the redundant configuration, e.g. class C and D traffic types could be restricted.

In a preferred embodiment a network alarm is raised by the network management function 514 indicating the failed element and listing the remedial configuration changes that have been automatically implemented.

In one embodiment, when only part of the cells of one base station (e.g. one cell) failed the base station reduces power of the signal transmitted in this cell (or disables (inactivates) the cell completely) and increases the power of signal transmitted in its two adjacent cells. For example, if base station serves three cells 120 degree each and one of these cells fails the implementation of the present invention involves inactivation of radio transmission from an antenna in the failed cell and increase power of transmitted signal in the two remaining cells of said base station. These steps will provide at least partial coverage in the failed cell. The increase of transmission power in the cells is controlled by the respective RNC 512 and/or the network management node 514. In this embodiment RBS acts independently until instructed by RNC 512. RNC 512 also acts independently until instructed by the OSS 514.

In another embodiment 120 degrees is considered a sector, which allows for three sectors in an RBS. The term sector in this embodiment is used because within one sector can be more then one cell—in this embodiment the cells in one sector use different frequencies. In this embodiment if one cell in a sector fails there is another cell in that sector which takes on the additional traffic when the failed cell is disabled.

A failure may develop in different parts of the network and depending on the location of the fault either part of the cells are affected by the malfunction or the whole radio base station is affected (i.e. all its cells). Different embodiments of the present invention deal with these different scenarios of fault development.

Figure 2:
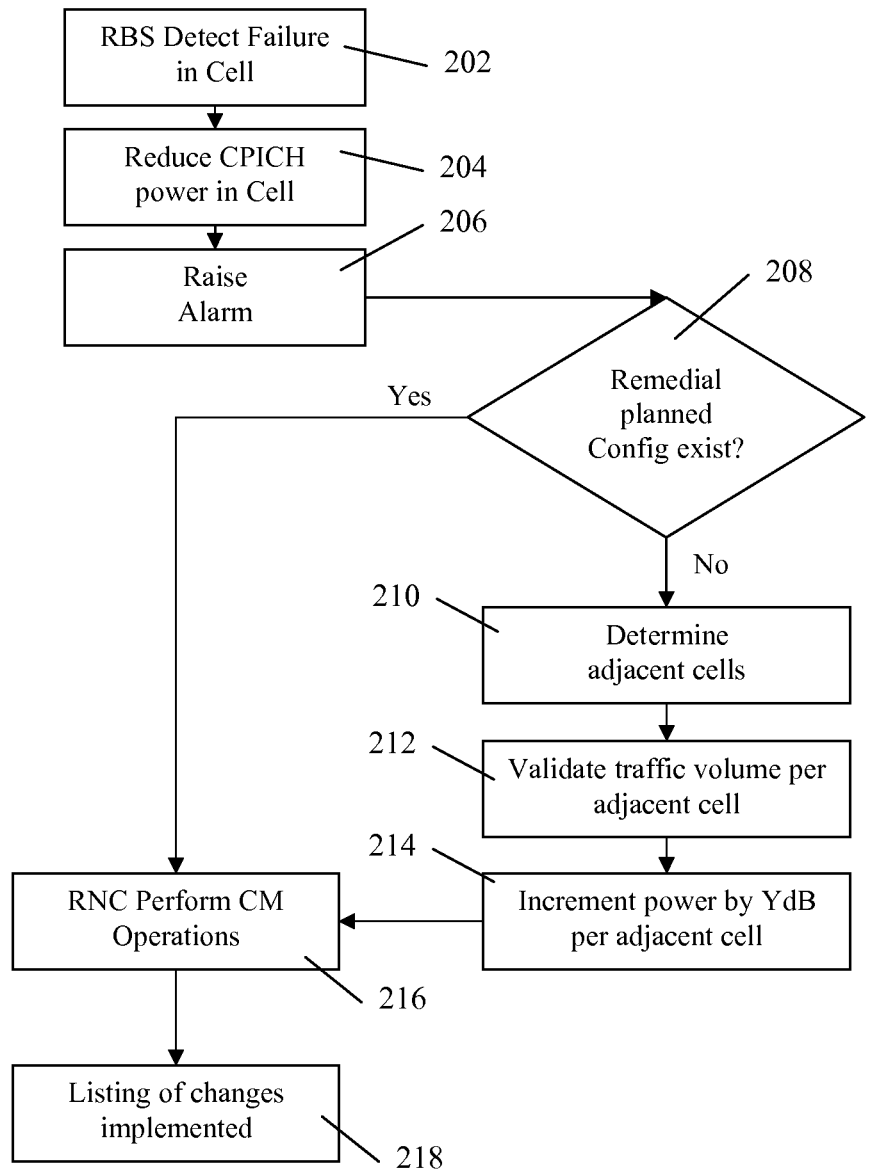
FIG. 2 is a flowchart illustrating a method of operating a wireless communications network in an alternative embodiment of the present invention.

In a first embodiment a failure in a cell is considered. This embodiment is illustrated in FIG. 2.

The first step is detection 202 of a malfunction that affected one or more cells served by the base station. This detection can be realised in a number of ways. One possible implementation is described below.

Figure 5:
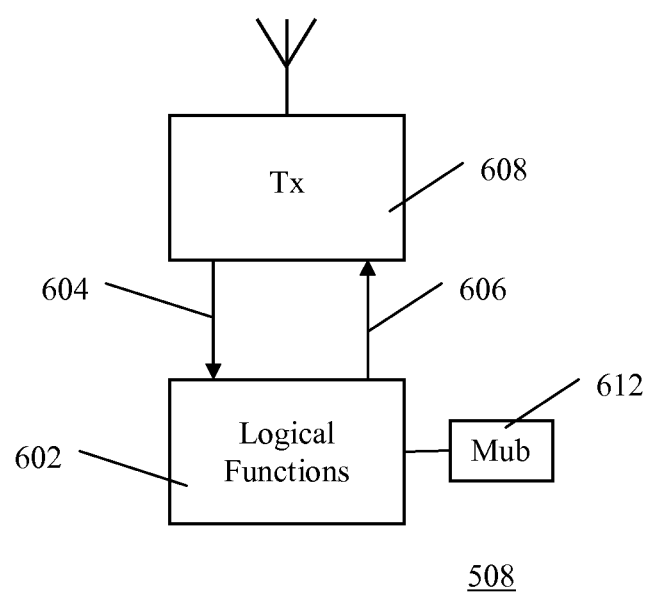
FIG. 5 is a diagram illustrating a radio base station in accordance with one embodiment of the present invention.

When a specific hardware component fails a notification is generated within the RBS 508. This notification is of type:alarm, and is pushed onto the alarm channel of the base station 508 notification system and forwarded by transmission over the Mub 612 interface to the OSS node 514. Mub is an O&M (operation and maintenance) interface between RBS and OSS 514. One feasible practical implementation of this procedure in a base station 508 illustrated in one embodiment in FIG. 5 is that logical functions 602 within the base station 508 listen to the alarm notification channel 604. These functions 602 filter for specific alarms and initiate remedial procedures such as powering down affected cell(s) by sending request to transmitter 608 via channel 606. The RNC 512 and/or the OSS node 514 take further remedial actions, such as reconfiguring the power of adjacent cells 516, 518, 520 and 524.

The base station deactivates (disables) the cell by reducing 204 power levels appropriately. As indicated in FIG. 2 in one embodiment of a UMTS network it is power of CPICH channel that is reduced. CPICH stands for Common Pilot Channel in UMTS and in other CDMA communications systems. It is a downlink channel broadcast by Node Bs with constant power. In other wireless systems other channels are used and the present invention also applies to these systems. When this signal disappears the subscriber stations start searching for alternative signals that can be used for handover. In one embodiment the transmission of signal by the base station in the affected cell is stopped by reducing CPICH power to zero or near zero. In an alternative embodiment this may be achieved by switching-off the transmitter in the affected cell. Reducing CPICH channel power to zero (or near zero) is a preferred option as it allows for live troubleshooting.

The base station simultaneously sends 206 the cell status information and an alarm to the network management node 514. In operation, cell status is monitored and controlled by the RNC 512; this is a function of the Iub, where Iub is an interface between RNC and RBS in WCDMA system. The alarm is pushed to the appropriate event notification channel and this channel is read by O&M applications on any node connected to the Mub. In a distributed implementation, and where all Mub are routed via RNC, the RNC would listen to the alarm notification channel and initiate remedial actions. In a centrally administered implementation, and where all Mub are routed to the OSS 514, the OSS 514 listens to the alarm notification channel and initiates remedial actions.

If there is an emergency configuration for this type of failure 208 stored in memory 526 the OSS 514 instructs the Radio Network Controller 512 to implement said planned remedial configuration 216, by modifying adjacent cell parameters as appropriate.

If there is no planned emergency configuration 208 the OSS 514 carries out an emergency reconfiguration by using the procedure described below.

The OSS 514 determines 210 the cells that are adjacent to the cell (or cells) that are affected by the failure. This information is necessary to provide network coverage in the area of the affected cell in the most efficient way (e.g. with the use of a limited number of adjacent cells).

Then, preferably, the OSS 514 validates 212 the traffic volume per adjacent cell, if necessary modifying the list of adjacent cells that are suitable for emergency reconfiguration. It may happen that one (or more) of the adjacent cells are heavily used and increasing its load would result in deterioration of a quality of services provided there. In this situation the initially selected adjacent cell should be replaced by another adjacent cell with lower traffic.

In order to provide network coverage of the affected cell the power of signal transmitted by the RBS in the adjacent cells is increased 214. Power increment Y is calculated for each of the selected adjacent cells. This increment may be different for each of the adjacent cells depending on terrain configuration, propagation condition, etc.

The list of the adjacent cells and their corresponding power increments Y determine the scope of the emergency reconfiguration.

The RNC 512 implements the cell reconfigurations as they are activated by the OSS 514.

In a preferred embodiment the OSS 514 automatically creates a list of the introduced changes of the configuration of the original network settings and raises an internal alarm referencing this configuration 218.

In this embodiment the OSS 514 is a separate entity, however in alternative embodiments various functions of the network management function are installed and operating on the various nodes (e.g. RBS, RNC) of the communications network.

Figure 3:
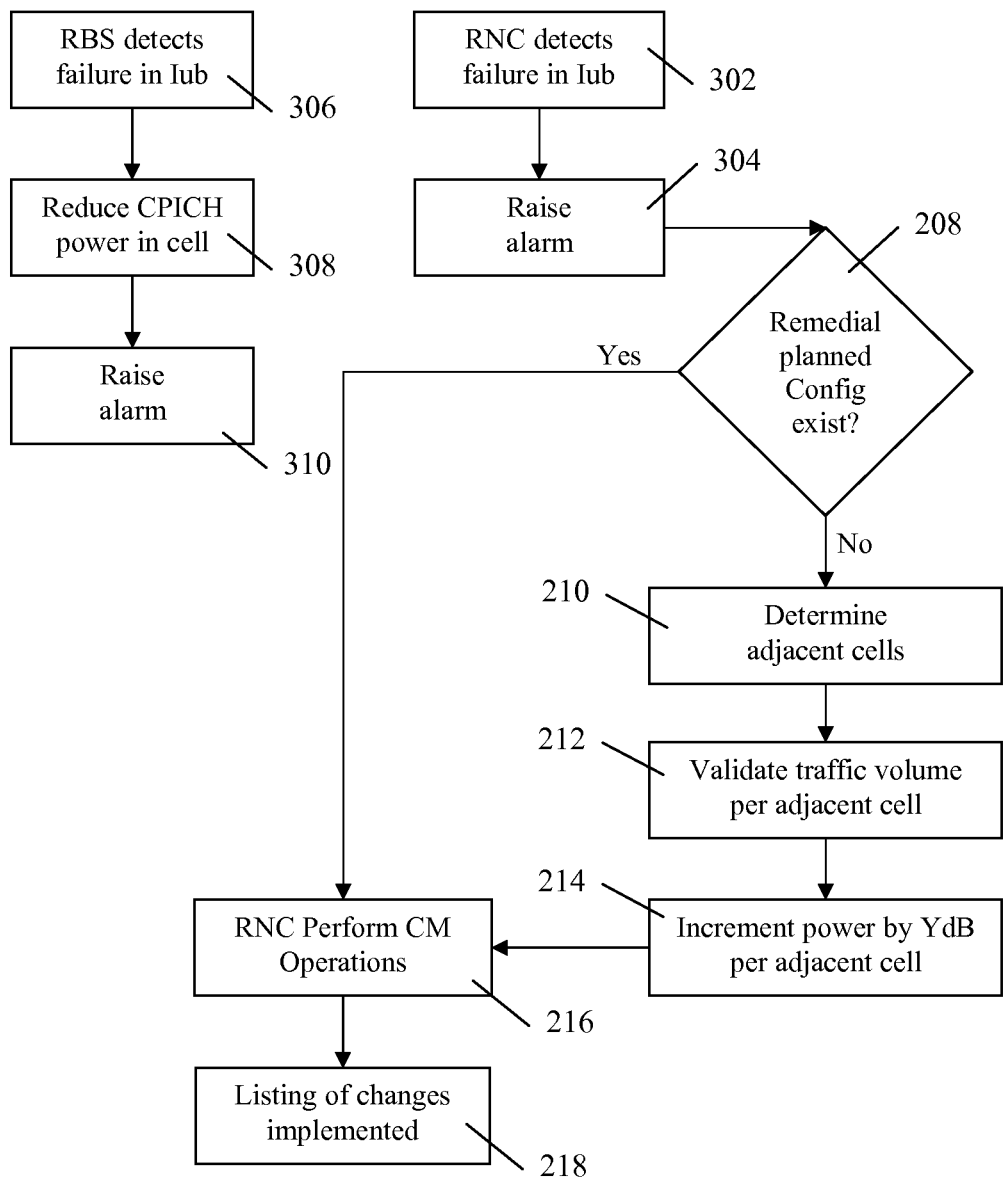
FIG. 3 is a flowchart illustrating a method of operating a wireless communications network in an alternative embodiment of the present invention.

In a second embodiment a connectivity failure towards RBS or a failure in Iub is considered. Iub is an interface between RNC and RBS in WCDMA system. However, this invention is also applicable to other failures (as well as failures in other systems) which result in lack of connection between the RBS and RNC. This embodiment is illustrated in FIG. 3.

In this embodiment both RBS and RNC detect that a connection between them has been lost (step 302 for RNC and step 306 for RBS).

The base station 508 after detection of the connection loss deactivates all cells, reducing CPICH power levels 308 and as a result all cells are disabled.

The base station simultaneously raises an alarm 310. Because Iub and Mub are down, alarm will not be visible outside the RBS. Mub is an O&M (operation and maintenance) interface between RBS and OSS 514 and because it goes via RNC 512 as illustrated in FIG. 4A it also does not work.

Simultaneously, the RNC 512 after detection of the failure rises an alarm 304 indicating that the Iub is down.

The following steps are similar to the ones in the first embodiment.

If there is an emergency configuration for this type of failure 208 the OSS 514 instructs the Radio Network Controller 512 to implement said planned remedial configuration 216, by modifying adjacent cell parameters.

If there is no planned emergency configuration 208 stored in memory 526 the OSS 514 carries out an emergency reconfiguration by using the following procedure.

The OSS 514 determines 210 the cells that are adjacent to the cells that are affected by the failure (in this embodiment all cells of the base station 508 are down). This information is necessary to provide network coverage in the area of the affected cells in the most efficient way (e.g. with the use of a limited number of adjacent cells, with lowest number of calls dropped, etc. . . . ).

Then, preferably, the OSS 514 validates 212 the traffic volume per adjacent cell and, if necessary, modifies the list of adjacent cells that are suitable for emergency reconfiguration. It may happen that one (or more) of the adjacent cells are heavily used and increasing its load would result in deterioration of a quality of services provided there. In this situation the initially selected adjacent cell should be replaced by another adjacent cell with lower traffic.

In order to provide network coverage of the affected cell (or cells) the power of signal transmitted by radio base stations in the adjacent cells is increased 214. Power increment Y is calculated for each of the selected adjacent cells. This increment may be different for each of the adjacent cells depending on terrain configuration, propagation condition, etc.

The list of the adjacent cells and their corresponding power increments Y determine the scope of the emergency reconfiguration.

The RNC 512 implements the cell reconfigurations as they are activated by the OSS 514.

In a preferred embodiment the OSS 514 instructs the RNC 512 to implement the cell reconfigurations by changing the transmission power and then the RNC 512 instructs respective RBSs.

In an alternative embodiment it is possible for the OSS 514 to bypass the RNC 512 to modify parameters of the transmission independent of the RNC 512. This would be necessary when the RNC 512 has failed and RBSs remain accessible to the OSS 514 through Mub.

In a preferred embodiment the OSS 514 automatically creates a list of the introduced changes of the configuration of the original network settings and raises an internal alarm referencing this configuration 218.

Also preferably, if there was no emergency configuration stored in a memory 526 of the OSS Network Controller 514 the configuration determined and implemented by the OSS 514, RNC 512 and base stations is stored in said memory 526 as an emergency configuration for future use if needed.

Preferably, while increasing power of the signal transmitted by the RBS in a cell helps the user equipment to see the cell, lowering the qRxlevmin, means the RBS can see the user equipment at a further distance (lower signal strength). In UMTS telecommunications system qrxlevmin represents the minimum required level of acceptable signal received from user equipment in the cell.

Figure 4A:
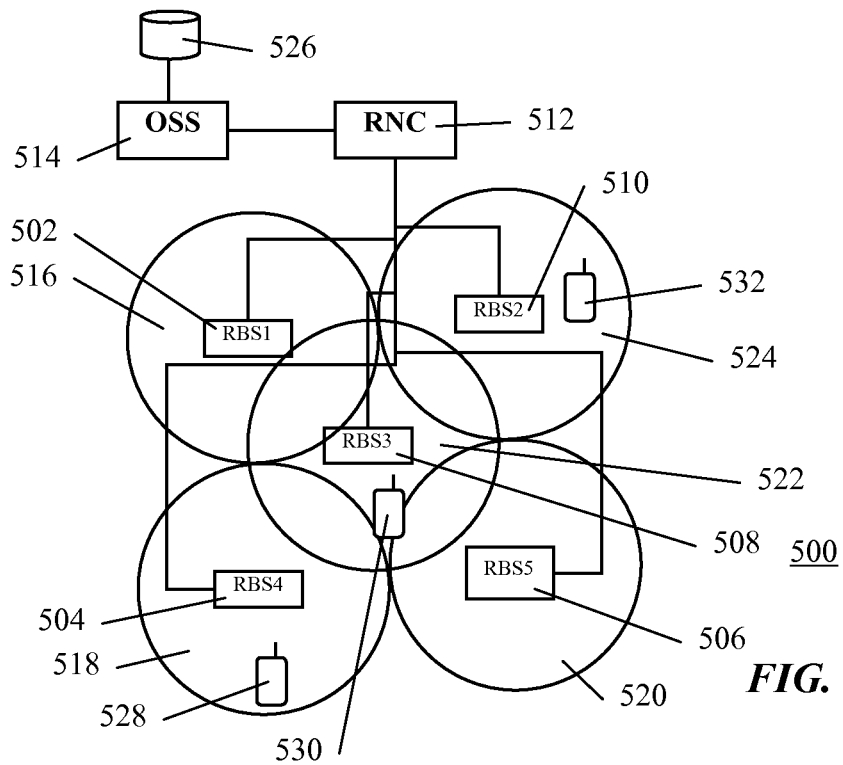
FIGS. 4A and 4B are diagrams illustrating a communications network operating in accordance with one embodiment of the present invention.
Figure 4B:
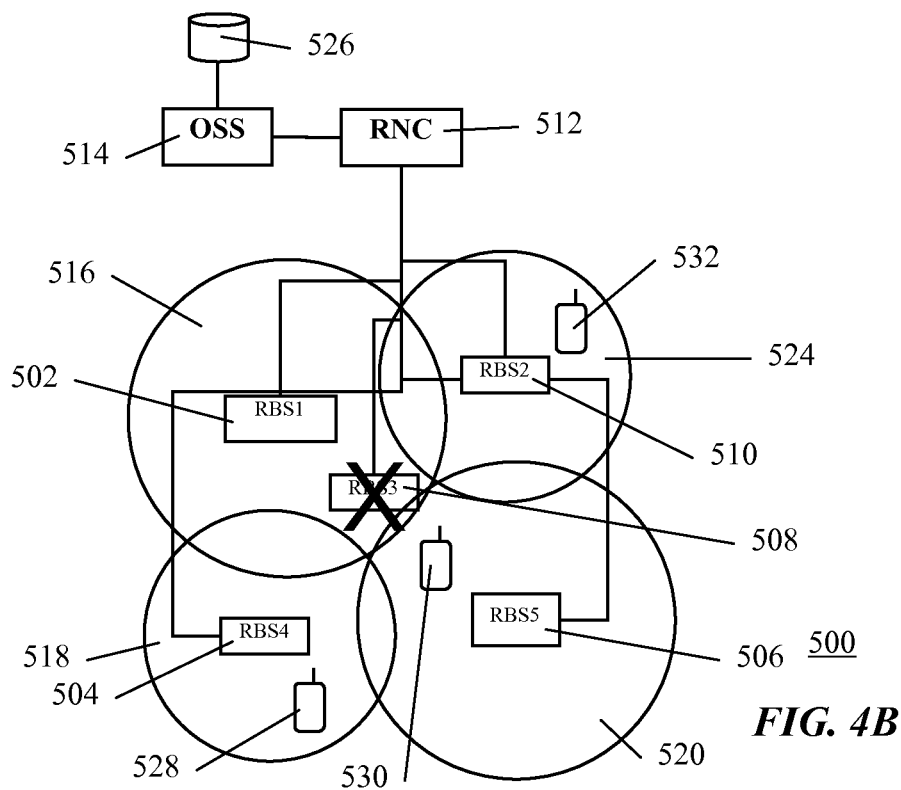

With reference to FIGS. 4A and 4B a wireless communications network in one embodiment is illustrated. The wireless communications network 500 comprises a first plurality of radio base stations (RBSs) 502-510. These base stations serve a second plurality of subscriber stations 528-532 (or user equipment). The subscriber stations can be mobile phones or data communications modules in computers, vending machines and the like. The network 500 also comprises and at least one Radio Network Controller 512 controlling said plurality of base stations 502-510. As explained in the description of the embodiments of the method in accordance with the present invention if a failure develops that affects operation of one of said first plurality of the base stations, e.g. base station 508 said base station detects the malfunction affecting services provided by the base station 508 and determines the cell(s) 522 affected by said failure. As discussed it can be a single cell or even all cells of the base station 508. If the base station 508 continues to transmit signal in the affected cells it is also adapted to reduce power of the signal transmitted in the affected cells or inactivate the affected cells. In one embodiment of a UMTS network the power of CPICH channel can be either significantly reduced or this channel can be switched off completely. When the CPICH channel disappears the subscriber stations that were camping on that channel 530 are forced to handover to other cells.

The Radio Network Controller 512 requests adjustment of power of the signal transmitted by the base stations in cells adjacent 516, 518, 520 and 524 to the affected cells 522 to provide network coverage in said affected cells 522. This increase of power of signal in the adjacent cells makes the handover process easier as the number of dropped calls is lower when handing-over to a cell with a strong signal.

In one embodiment the network 500 comprises an OSS 514 adapted to receive alarms indicating failures detected by a base station and to raise an alarm listing configuration changes that have been implemented. Because the changes are temporary and implemented in the state of emergency and should be removed once the failure is repaired it is very useful to know what has been changed in the network configuration as a result of these remedial steps.

In one embodiment of the present invention a base station 508 for use in a wireless communications network is disclosed. The base station is adapted to detect a malfunction affecting services it provides and determine cell(s) affected by said malfunction. In certain situations despite the failure the base station continues to transmit its CPICH channel in the affected cell. If that happens the base station reduces power of CPICH channel signal transmitted in the cell affected by the failure.

In yet another embodiment a network management system 514 for a wireless communications network 500 is disclosed. The system is adapted to operate in accordance with the method disclosed hereinbefore. In one embodiment the network management system is centrally located in a single network element 514 and in an alternative embodiment the network management system is distributed on various network elements of the network 500 (e.g. on RBSs, RNC).

The invention claimed is:

1. A method of operating a wireless communications network comprising:
   detecting a malfunction affecting provision of services by a base station;
   determining cell affected by said malfunction;
   reducing power of signal transmitted by said base station in the affected cell below a required level for communicating with a subscriber station, if said base station continues to transmit signal in said affected cell;
   determining a traffic volume of cells adjacent to said affected cell to:
      identify adjacent cells with capacity to handle additional subscriber stations; and
      modify a list of adjacent cells that are suitable to handle additional subscriber stations, wherein the list of adjacent cells is modified by replacing a first adjacent cell with a second adjacent cell having a lower traffic volume if increasing the traffic volume of the first adjacent cell would result in deterioration of quality of services provided in the first adjacent cell;
   adjusting power of signal transmitted in cells adjacent to said affected cell to provide network coverage for the affected cell and to distribute the traffic volume.

2. The method according to claim 1, wherein said base station inactivates the affected cell.

3. The method according to claim 1 comprising sending by the base station cell status information and an alarm indicating the affected cell to a network management function.

4. The method according to claim 1 comprising raising an alarm by a network management function listing configuration changes that have been implemented.

5. The method according to claim 1 comprising initiating handover procedure for subscriber stations from the affected cells to said adjacent cells.

6. The method according to claim 1 comprising determining the number of adjacent cells to provide network coverage in the affected cells.

7. The method according to claim 6 comprising storing the list of adjacent cells and their power levels as an emergency configuration.

8. The method according to claim 1 comprising validating traffic in the adjacent cells and adjusting the power of signal transmitted by the base stations in the adjacent cells in order to distribute the traffic.

9. The method according to claim 1 comprising using an existing emergency configuration for modification of power levels in the adjacent cells.

10. The method according to claim 1 comprising lowering minimum required level of acceptable signal received from user equipment in the cell.

11. The method according to claim 1, wherein the operation of determining a traffic volume of cells adjacent to said affected cell comprises determining traffic volume per adjacent cell and the method further comprises:

modifying a list of adjacent cells that are suitable for emergency reconfiguration based on results of the determined traffic volume per adjacent cell.

12. A wireless communications network comprising:

a first plurality of base stations serving a second plurality of subscriber stations and at least one Radio Network Controller controlling said plurality of base stations;

wherein a base station is adapted to detect a malfunction affecting provision of services by the base station, determine cell affected by said malfunction; and wherein the base station is also adapted to reduce power of signal transmitted in the affected cell below a required level for communicating with the second plurality of subscriber stations, if said base station continues to transmit signal in said affected cell and the network further comprises a network management function adapted to:

determine a traffic volume of cells adjacent to said affected cell to:

identify adjacent cells with capacity to handle additional subscriber stations; and modify a list of adjacent cells that are suitable to handle additional subscriber stations, wherein the list of adjacent cells is modified by replacing a first adjacent cell with a second adjacent cell having a lower traffic volume if increasing the traffic volume of the first adjacent cell would result in deterioration of quality of services provided in the first adjacent cell;

request adjustment of power of signal transmitted by base stations in cells adjacent to said affected cell to provide network coverage for the affected cell and to distribute the traffic volume.

13. The network according to claim 12, said base station is adapted to inactivate the affected cell.

14. The network according to claim 13, wherein the base station is adapted to send cell status information and an alarm indicating the affected cell to a network management function.

15. The network according to claim 12 comprising a network management function adapted to raise an alarm listing configuration changes that have been implemented.

16. The network according to claim 12, wherein the base stations from the adjacent cells are adapted to carry out a handover procedure for subscriber stations from the affected cells to said adjacent cells.

17. The network according to claim 16 comprising a network management function adapted to validate traffic in the adjacent cells and to request adjustment of the power of signal transmitted by the base stations in the adjacent cells in order to distribute the traffic.

18. The network according to claim 16 comprising a memory for storing the list of adjacent cells and their power levels as an emergency configuration.

19. The network according to claim 12, wherein the network management function is adapted to modify the number of adjacent cells to provide network coverage in the affected cells.

20. The network according to claim 12, wherein the Radio Network Controller is adapted to use an existing emergency configuration for modification of power levels in the adjacent cells.

* * * * *